(No Model.)

J. GREEN.
COFFEE POT.

No. 495,937. Patented Apr. 18, 1893.

Witnesses
G. W. Taubenschmidt
H. B. Reinohl

Inventor
John Green
By D. L. Reinohl
Attorney

THE NORRIS PETERS CO., PHOTO-LITHO., WASHINGTON, D. C.

UNITED STATES PATENT OFFICE.

JOHN GREEN, OF RENOVO, PENNSYLVANIA, ASSIGNOR OF ONE-HALF TO DANIEL O'CONNELL, OF SAME PLACE.

COFFEE-POT.

SPECIFICATION forming part of Letters Patent No. 495,937, dated April 18, 1893.

Application filed October 1, 1892. Serial No. 447,532. (No model.)

*To all whom it may concern:*

Be it known that I, JOHN GREEN, a citizen of the United States, residing at Renovo, in the county of Clinton and State of Pennsylvania, have invented certain new and useful Improvements in Coffee-Pots; and I do hereby declare the following to be a full, clear, and exact description of the invention, such as will enable others skilled in the art to which it appertains to make and use the same.

My present invention relates to coffee-pots and has for its object certain improvements in construction of a receptacle for holding coffee or tea while the essence thereof is being extracted.

The invention will be fully disclosed in the following specification and claims.

Figure 1:
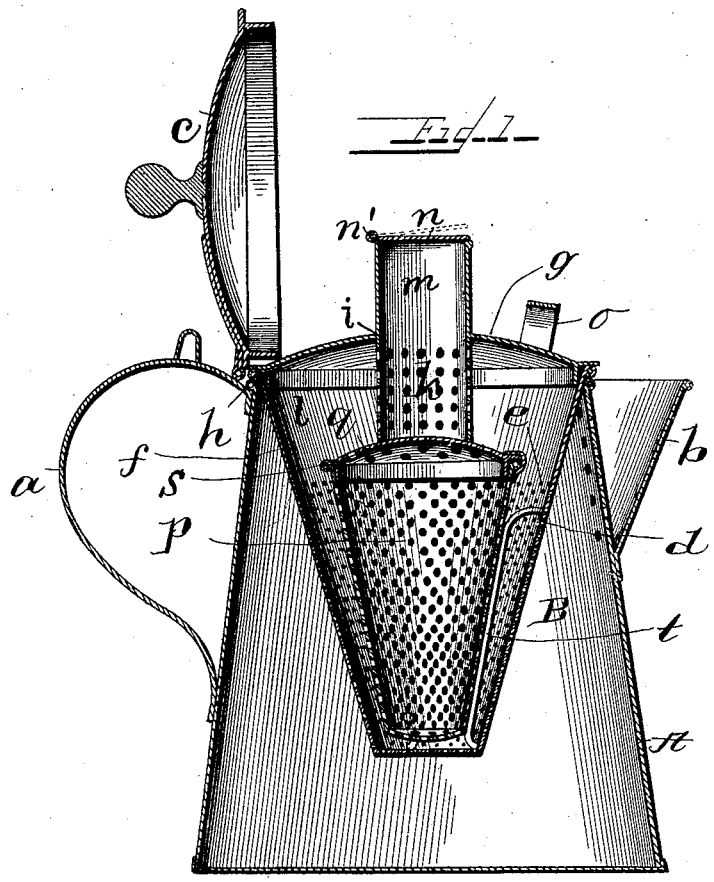
Figure 2:
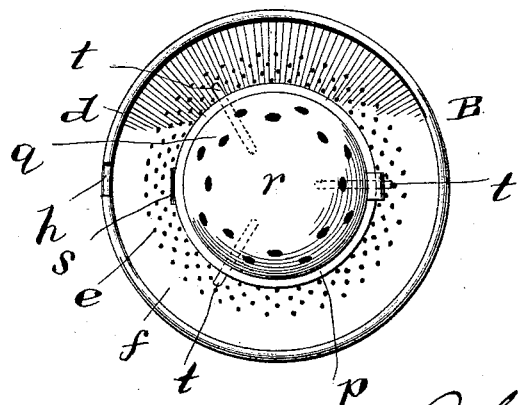

In the accompanying drawings which form part of this specification, Figure 1, represents a vertical section of a coffee-pot with the receptacle in position for use, and Fig. 2, a top plan view of the receptacle detached from the pot and the cover of the outer vessel removed.

Reference being had to the drawings and the letters thereon, A indicates a coffee-pot of ordinary construction, having the usual handle $a$, spout $b$ and cover $c$.

B indicates the filter or strainer of my improved construction and consists of an outer vessel $d$ whose wall is finely perforated at $e$ to a little above its vertical median line and above the perforated portion is an imperforate portion $f$ to form a steam chamber. The wall of the vessel $d$ is shown conical and the apex of the cone at the lower end of the vessel and is also perforated, and the vessel is provided with a cover $g$ which may be hinged thereto at $h$. The cover is provided with a cylinder $i$ which projects above and below the cover, the lower end being perforate at $k$ for steam to enter from the chamber $l$, and the upper end imperforate and forming a steam-dome $m$ which is provided with a cover $n$ hinged thereto at $n'$ and forming an escape valve for the steam.

This construction of the cover for the outer vessel is designed for use in ordinary coffee-pots, but it is my purpose to construct coffee-pots in which the cover shall be provided with the cylinder $i$ and serve as a cover for the outer vessel $d$, and for the coffee-pot after the filter or strainer has been removed. The cover $g$ is also provided with a loop $o$ for raising it out of or off the vessel $d$. Within the vessel $d$ is another vessel $p$ coarsely perforated in its wall, bottom and part of the removable cover $q$, and is made the receptacle for coffee or tea, the coarse perforations being provided to admit water freely to come in contact with and permeate the body of coffee or tea and filter through it, while the fine perforations in the wall of the outer vessel $d$ serve as a strainer to prevent sediment passing into the pot to be poured off with the liquid. The center portion of the cover $q$ is imperforate at $r$ to prevent the coffee rising into the cylinder $i$ or the aroma escaping directly therethrough, and said cylinder $i$ rests upon the part $r$ and serves to hold the vessel $p$ down in its place in the vessel $d$. The cover $q$ may also be hinged to the vessel $p$ at $s$ or it may be an ordinary tight fitting cover without a hinge. The vessel $p$ rests upon supports $t$ secured to keep the two vessels separated and form a surrounding water chamber for the inner vessel in which the water circulates freely without ebullition while the water is boiling in the pot, thus securing a thorough extraction of the essence of the coffee without agitation and consequently with the minimum of escape of fine particles of coffee into the pot. The outer vessel is supported upon the upper end of the coffee-pot, and after the coffee has been boiled or steeped sufficiently to extract its essence, the filter and strainer are removed, and the cover $c$ of the pot closed when the coffee will be ready for use, and will pour from the spout clear and absolutely free from sediment. In filling the coffee-pot with boilng water, the water may be poured on the top of the vessel $p$ by raising the cover $g$ of the outer vessel $d$, or it may be poured into the cylinder $i$, and in either instance will percolate through the coffee in the vessel $p$, and extract the essence therefrom.

Having thus fully described my invention, what I claim is—

1. A coffee-pot, in combination with a removable filter or strainer consisting of an outer vessel having the lower portion of its wall perforated and the upper portion imperforate, a foraminous coffee receptacle within the outer vessel, a cover for the outer vessel and a perforated steam conductor attached to said cover extending to the top of the inner vessel and provided with an escape.

2. A coffee-pot, in combination with a filter or strainer consisting of an outer vessel provided with a finely perforated body, a coffee receptacle having a coarsely perforated body, separate from the outer vessel and supported within and out of contact with said vessel to form a water chamber around the coffee receptacle, a removable top or cover for said inner vessel, and a tubular conductor attached to the cover of the outer vessel and resting upon the cover of the inner vessel.

3. A filter or strainer for coffee-pots, consisting of an inner foraminous vessel having a cover provided with a perforate and imperforate portion and an outer vessel having a wall provided with a perforate and imperforate portion and a cover provided with a perforated cylinder resting upon the inner vessel and having a hinged cover.

In testimony whereof I affix my signature in presence of two witnesses.

JOHN GREEN.

Witnesses:
D. C. REINOHL,
H. B. REINOHL.